Oct. 31, 1933.  K. NIEMANN  1,933,118
CURRENT MEASURING SYSTEM
Filed Sept. 17, 1929
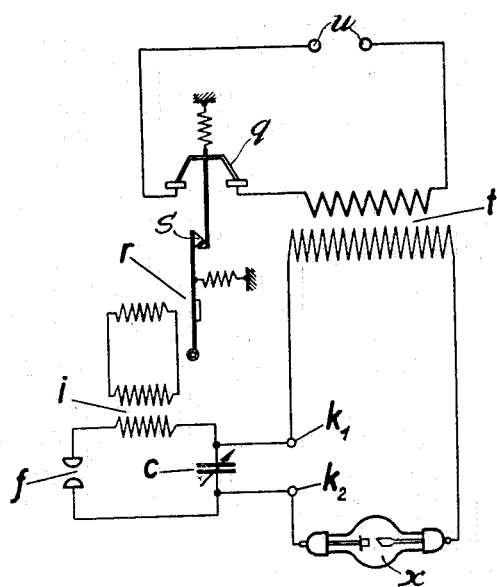
INVENTOR
KARL NIEMANN
BY
ATTORNEYS Patented Oct. 31, 1933

1,933,118

UNITED STATES PATENT OFFICE 1,933,118

CURRENT MEASURING SYSTEM

Karl Niemann, Berlin-Siemensstadt, Germany, assignor to the firm Siemens-Reiniger-Veifa Gesellschaft fur medizinische Technik m. b. H., Berlin, Germany Application September 17, 1929, Serial No. 393,143, and in Germany September 19, 1928

4 Claims. (Cl. 250—34)

This invention relates to improvements in electrical current measuring systems and has particular reference to a system to be employed in connection with the operation of Roentgen tubes.

In the process of photographing an object by X-rays, a definite value must be given to the product of the tube current and the exposure time. This is usually accomplished by setting the tube current and the exposure period separately. For short time exposures, however, it is not possible to do this. It is true that a setting at definite values before the exposure can be made, but, since it is unknown how great the current strength actually will be at the instant of exposure, a definite correspondence between the current strength and the setting made is not assured. There is, therefore, a need for a system of measuring the product of tube current value and exposure time in milliampere seconds.

In accordance with the present invention, there is provided an especially simple system for solving the above problem and which may also be used to accomplish the automatic switching off of the Roentgen tube. Essentially, the system involves the use of a condenser to be charged with the direct current, the measurement of which is one factor of the product to be determined, and this condenser is connected to a voltage measuring device using but little current. The current to be measured charges the condenser up to a voltage which is proportional to it and to the elapsed time of exposure. The voltage measuring device thereby indicates, at every moment, the milliampere seconds. The system may also be provided with a switching means to effect the shutting off of the Roentgen tube at a set milliampere seconds value. Also, instead of a continuously indicating voltmeter, one can be used which only indicates at a certain minimum voltage and only then uses current, and which can be conveniently employed in connection with a switching means.

The inventive idea involved is capable of receiving a variety of expressions, one of which is shown diagrammatically in the accompanying drawing:

In the drawing, $c$ indicates the condenser of the measuring system which is connected, by binding posts $k1$ and $k2$, into the circuit in which flows intermittently the direct current to be measured. The capacity of the condenser is of such magnitude that the latter does not become fully charged even when the maximum current flows through the circuit, it being understood that the current impulses last for only fractions of a second. The condenser $c$ is preferably of the variable type and is in series with an X-ray tube $x$ connected to the high tension side of a transformer $t$. Parallel to the condenser $c$ there is the measuring device which may be, for instance, a spark gap $f$. The use of a spark gap $f$ or discharge tube is especially suitable and such elements are also voltmeters which, however, in practice use no current until a certain voltage is attained to which they correspond. This voltage, which can be varied in the spark gaps, for instance, by varying the space between the electrodes, and in discharge tubes by connection to a variable potentiometer, corresponds to a definite milliampere second value. The current transversing the circuit during operation can be used to control a switching means, for instance, to actuate a relay $r$ through a current transformer $i$ which simultaneously effects the insulation between the high potential system and the relay current circuit; the relay may interrupt, by operation of a switch $g$ held by a latch $s$, the primary current circuit of the high tension transformer $t$, which is connected to the source of electromotive force through the binding posts $u$. The discharge current can also connect any desired indicating apparatus.

The condenser $c$ may also be constructed as a step-by-step condenser to make it possible to set several measurement ranges for the milliampere seconds when a static measuring device is used. If a spark gap is used as an indicating means of the electromotive force on the condenser $c$, then, to avoid uncontrollable variations of the gap length, there is preferably used a continuously variable condenser $c$ so as to be able to set the relay to all milliampere second values.

What is claimed is:

1. A system for controlling the energization of an X-ray tube in accordance with the tube current and exposure time, comprising a primary circuit, a secondary circuit coupled therewith, said secondary circuit including an X-ray tube and condenser connected in series, means connected to the condenser for discharging the same after a predetermined voltage is developed at the condenser terminals, said means and condenser forming parts of an auxiliary circuit, and other means cooperating with said primary and auxiliary circuits for deenergizing said primary circuit upon discharge of said condenser.

2. A system for controlling the energization of an X-ray tube in accordance with the tube current and exposure time, comprising an electrical circuit including an X-ray tube and a condenser connected in series, means cooperating with said circuit for supplying the same with electrical current, means connected to the condenser for discharging the same after a predetermined voltage is developed at the condenser terminals, said means and condenser forming parts of an auxiliary circuit, a winding connected in series with said means and said condenser and forming a part of said auxiliary circuit, a relay, means cooperating with said winding and said relay for actuating said relay upon discharge of said condenser, and means cooperating with the first-mentioned means and said relay and interrupting the supply of the current to said circuit upon actuation of said relay.

3. A system for controlling the energization of an X-ray tube in accordance with the tube current and exposure time, comprising a primary circuit, a secondary circuit coupled therewith, said secondary circuit including an X-ray tube and condenser connected in series, a spark gap connected to the condenser for discharging the same after a predetermined voltage is developed at the condenser terminals, said spark gap and said condenser forming parts of an auxiliary circuit, and means cooperating with said primary and auxiliary circuits for deenergizing said primary circuit upon discharge of said condenser.

4. A system for controlling the energization of an X-ray tube in accordance with the tube current and exposure time, comprising a primary circuit, a secondary circuit coupled therewith, said secondary circuit including an X-ray tube and condenser connected in series, a spark gap connected to the condenser for discharging the same after a predetermined voltage is developed at the condenser terminals, said spark gap and said condenser forming parts of an auxiliary circuit, a relay switch within said primary circuit, a relay connected with said relay switch, a winding connected in series with said spark gap and said condenser and forming a part of said auxiliary circuit, and another circuit comprising two interconnected windings, one of the last-mentioned windings being coupled with the first-mentioned winding, the other one of the last-mentioned windings being coupled with said relay.

KARL NIEMANN.